(No Model.)
A. H. & T. A. SCHLUETER.
SELF REGULATING DISCHARGE FOR CLOSED VESSELS.
No. 517,305. Patented Mar. 27, 1894.
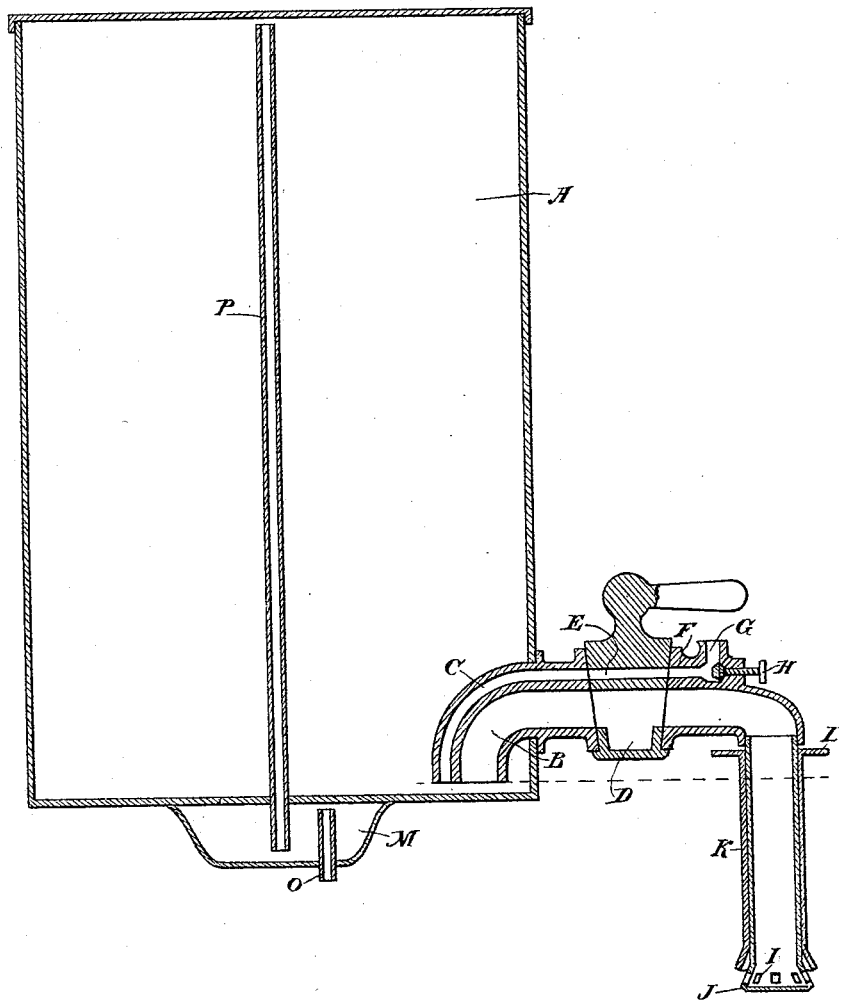
Witnesses,
Inventors,
Adolph H. Schlueter
Theodor A. Schlueter
By Dewey & Co.
attys

UNITED STATES PATENT OFFICE.

ADOLPH H. SCHLUETER AND THEODORE A. SCHLUETER, OF OAKLAND, CALIFORNIA.

SELF-REGULATING DISCHARGE FOR CLOSED VESSELS.

SPECIFICATION forming part of Letters Patent No. 517,305, dated March 27, 1894.

Application filed February 28, 1893. Serial No. 464,038. (No model.)

*To all whom it may concern:*

Be it known that we, ADOLPH H. SCHLUETER and THEODORE A. SCHLUETER, citizens of the United States, residing in Oakland, Alameda county, State of California, have invented an Improvement in Self-Regulating Discharges for Closed Vessels; and we hereby declare the following to be a full, clear, and exact description of the same.

Our invention relates to a discharging apparatus for closed vessels of any kind, containing liquids.

It consists in certain details of construction which will be more fully explained by reference to the accompanying drawing.

The object of our invention is to provide a means for allowing liquid to flow from an air tight vessel whenever the discharge passage is open, and for arresting the flow from said passage whenever the receptacle has been filled to the proper height, and to prevent overflow of the latter. This may be effected with any hermetically closed vessel, cask, or other container.

In the present case we have shown a containing vessel A which is provided with a discharge pipe B, near the bottom. This pipe is shown as curved so that its inner end is near the bottom for the purpose of drawing out all the liquid in the containing vessel. The outer end of the discharge pipe is carried down below its inner end so that the amount of liquid in the outer arm of the discharge pipe is always greater than that in the inner arm, and by its superior weight will cause a constant flow of liquid in the manner of a siphon.

C is a passage of small diameter, which is made in or along the upper part of the body of the discharge pipe B, and independent thereof. The cock D has an opening made in it corresponding with the liquid discharge passage of pipe B, and another small opening E made through the upper part of it corresponding in position with the passage C, and parallel with the liquid discharge passage in the lower part. In line with this passage E and exterior thereto, is a short extension F, having at any convenient point an opening G which is controlled by a suitable screw plug or other cut off H, so that its passage may be opened or closed at pleasure. When the discharge pipe B is opened by turning the cock D, the liquid will commence to flow through the pipe B until a small vacuum is produced in the upper part of the chamber A by reason of its being hermetically closed. When the cock D is first turned, and before any liquid has been drawn from the receptacle, the opening G is closed by the stop cock H to prevent the liquid from flowing out through this passage, as well as the passage B, but as soon as the liquid has commenced to flow and the slight vacuum in the vessel has been produced, the cock H is opened and by reason of the vacuum, air will flow into the vessel through the passage C to take the place of the liquid which is flowing out through the passage B, and by reason of the extension of the outer end of the passage B below its inner end, the superior weight of the liquid below this level will cause it to continue to flow until such time as the cock is closed, or until the liquid outside rises to the level of the inlet end of the air passage. This latter result will take place when the vessel to be filled is held up beneath the discharge end of the pipe B, with its upper edge above the level of the inside end of the pipe B and of the air passage C, and this will cause the liquid to stop flowing before the vessel or receiver is filled sufficiently to cause it to overflow.

In order to prevent the liquid from flowing out of part of the discharge pipe B, when the cock is closed, and to keep it charged with liquid, we close the lower end of the pipe and make holes or perforations I around the periphery just above the bottom. This periphery is made conical, as shown at J, with the base of the cone at the bottom and of larger diameter than the pipe B itself. Around this pipe is loosely fitted a cylindrical sleeve K, the bottom of which is open and is made conical to correspond with the cone J at the bottom of the pipe B. When this sleeve is allowed to drop by gravitation, the inner face of its conical lower end, fits upon the exterior surface of the cone J at the bottom of the pipe B, and thus closes the openings I which are made through said cone, and prevents any escape of liquid which remains in that part of the pipe which is outside of the cock D. When it is desired to draw liquid into any vessel or receiver, the latter being of sufficient depth for the purpose, is raised up under the end of the pipe B until its edge strikes a flange L formed around the upper part of the sleeve K, and thus raises the sleeve and its conical base so as to leave the openings I free to discharge liquid whenever the cock D is turned. As before stated, when the vessel is thus held, its upper edge is above the level of the interior ends of the discharge pipe B and the air inlet pipe C, and the liquid will thus cease to flow into the receiver as soon as it is filled to that level.

M is a trap made in the lower part of the chamber A, as shown, and having an overflow pipe O. From this trap a pipe P extends up inside the chamber A to a point near the top. The trap M being filled with liquid to the proper depth, covers the lower end of the pipe P, while the upper end of the pipe O is above the level of the liquid. This being the condition before anything is drawn from the chamber A, when the cock D is opened and the flow of liquid commences to produce a vacuum in the upper part of the chamber, the liquid in the trap M will be drawn upward in the pipe P to a height depending on the amount of vacuum produced, but enough liquid will remain in the trap to always cover the lower end of the pipe P.

If, at any time, when the vessel is closed, there should be sufficient gas within it, or sufficient expansion of the air therein to create a little pressure, it will be manifest that the liquid would be forced down through the pipe P into the trap, and if the pressure reached a sufficient point, the surplus air, gas, or vapor would force its way out through the pipe O without admitting any air into the interior of the chamber, which thus always remains hermetically sealed as far as any admission of air into it is concerned, except when the liquid is drawn through the faucet in which instance air enters the vessel. This latter construction is for the purpose of preventing a pressure on the inside, which pressure would be very objectionable in turning on the cock D when the cock H is left off for economy.

Having thus described our invention, what we claim as new, and desire to secure by Letters Patent, is—

A hermetically closed vessel having a discharge pipe with air inlet opening, a cock with a second passage opening simultaneously with the opening of the discharge pipe for the admission of air into the interior of the vessel and a trap at the lower end of the chamber having an air pipe extending from it up to the top of the interior of the vessel and an overflow pipe extending downwardly from the trap, substantially as herein described.

In witness whereof we have hereunto set our hands.

ADOLPH H. SCHLUETER.
THEODORE A. SCHLUETER.

Witnesses:
A. CAMPBELL,
L. L. M. SALSBURY.